(12) United States Patent
Zhang et al.

(10) Patent No.: US 12,170,984 B2
(45) Date of Patent: Dec. 17, 2024

(54) WIRELESS COMMUNICATIONS DEVICE

(71) Applicant: NXP USA, Inc., Austin, TX (US)

(72) Inventors: Hongyuan Zhang, Fremont, CA (US);
Sudhir Srinivasa, Los Gatos, CA (US);
Ken Kinwah Ho, San Jose, CA (US);
Timothy J. Donovan, Carmel, CA (US); Foo Keong Tang, San Jose, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 236 days.

(21) Appl. No.: 17/655,987

(22) Filed: Mar. 22, 2022

(65) Prior Publication Data

US 2023/0309069 A1  Sep. 28, 2023

(51) Int. Cl.
H04W 72/04 (2023.01)
H04W 72/0446 (2023.01)
H04W 84/12 (2009.01)

(52) U.S. Cl.
CPC ........ *H04W 72/0446* (2013.01); *H04W 84/12* (2013.01)

(58) Field of Classification Search
CPC .......................... H04W 72/0446; H04W 84/12
See application file for complete search history.

(56) References Cited

U.S. PATENT DOCUMENTS

| 2010/0309871 A1 | 12/2010 | Fischer et al. |
| 2014/0219284 A1 | 8/2014 | Chau et al. |
| 2016/0330753 A1 | 11/2016 | Jauh et al. |
| 2017/0041961 A1 | 2/2017 | Zou et al. |
| 2017/0064708 A1 | 3/2017 | Noh et al. |
| 2017/0195107 A1 | 7/2017 | Liu |
| 2017/0244769 A1* | 8/2017 | Cauduro Dias de Paiva ............. H04L 65/611 |
| 2018/0027453 A1* | 1/2018 | Viger ................ H04W 74/0816 370/336 |
| 2018/0279368 A1 | 9/2018 | Butt et al. |
| 2019/0053275 A1* | 2/2019 | Lanante ................ H04W 72/23 |

(Continued)

FOREIGN PATENT DOCUMENTS

WO  WO-2020160774 A1  8/2020

OTHER PUBLICATIONS

Huang, Po-Kai et al, Intel; "MU-RTS/CTS for DL MU"; Document IEEE 802.11-15/0867r1; 24 pages (Jul. 14, 2015).

(Continued)

*Primary Examiner* — Derrick V Rose

(57) ABSTRACT

One example discloses a wireless Access Point (AP) device, configured to operate within a wireless local area network (WLAN), including: a controller configured to generate a reserve slot time trigger frame and a request to transmit trigger frame; wherein the controller is configured to be coupled to an antenna; wherein the antenna is configured to transmit the trigger frames over a physical media to a set of user station devices (STAs) and exchange traffic with the set of STAs over the physical media; wherein the reserve slot time trigger frame is configured to reserve a slot time on the physical media; and wherein the request to transmit trigger frame is configured to command a first STA from the set of STAs to transmit data buffered in the first STA to the AP device.

27 Claims, 14 Drawing Sheets

(56) References Cited

U.S. PATENT DOCUMENTS

2020/0068563 A1    2/2020  Wu et al.
2020/0120711 A1*   4/2020  Sevin ..................... H04L 5/001

OTHER PUBLICATIONS

Kwon, Young Hoon et al, Newracom; "Protection Using MU-RTS/CTS"; Document IEEE 802.11-16/0048r0; 11 pages (Jan. 18, 2016).
U.S. Appl. No. 17/655,979, filed Mar. 22, 2022; 43 pages.
U.S. Appl. No. 17/655,979; Non-Final Office Action mailed on Mar. 27, 2024; 17 pages.
U.S. Appl. No. 17/655,979; Final Office Action mailed on Jul. 17, 2024; 17 pages.
U.S. Appl. No. 17/655,979; Notice of Allowance mailed on Sep. 13, 2024; 9 pages.

* cited by examiner

WIRELESS COMMUNICATIONS DEVICE

The present specification relates to systems, methods, apparatuses, devices, articles of manufacture and instructions for wireless communications.

SUMMARY

According to an example embodiment, a wireless Access Point (AP) device, configured to operate within a wireless local area network (WLAN), comprising: a controller configured to generate a reserve slot time trigger frame and a request to transmit trigger frame; wherein the controller is configured to be coupled to an antenna; wherein the antenna is configured to transmit the trigger frames over a physical media to a set of user station devices (STAs) and exchange traffic with the set of STAs over the physical media; wherein the reserve slot time trigger frame is configured to reserve a slot time on the physical media; and wherein the request to transmit trigger frame is configured to command a first STA from the set of STAs to transmit data buffered in the first STA to the AP device.

In another example embodiment, the controller is configured to command the first STA to transmit the data buffered in the first STA by sending a request to transmit trigger frame addressed to only the first STA.

In another example embodiment, the request to transmit trigger frame includes a station identifier (STA-id) for the first STA.

In another example embodiment, the controller is configured to command the second STA to transmit the data buffered in the second STA by sending a second request to transmit trigger frame addressed to only the second STA by including a STA-id for the second STA.

In another example embodiment, the request to transmit trigger frame includes station identification fields for all STAs in the set of STAs; and only one of the station identification fields is populated with the STA-id for the first STA.

In another example embodiment, the reserve slot time trigger frame is an IEEE802.11ax standard compliant uplink (UL) trigger frame.

In another example embodiment, the controller is configured to command all STAs in the set of STAs to transmit their buffered data during the slot time.

In another example embodiment, the slot time corresponds to an IEEE802.11ax standard MU_RTS trigger frame reserved slot time.

In another example embodiment, the controller is configured to transmit multiple reserve slot time trigger frames configured to reserve multiple slot times; and the controller is configured to command all STAs in the set of STAs to sequentially transmit their buffered data in a first order during a first one of the multiple slot times and in a second order during a second one of the multiple slot times.

In another example embodiment, the reserve slot time trigger frame is a request to send trigger frame (MU_RTS).

In another example embodiment, the data buffered is uplink (UL) data from the STAs.

In another example embodiment, the controller is configured to identify a type of traffic to be received from each STA in the set of STAs.

In another example embodiment, the type of traffic is at least one of: gaming data, video data, audio data, photo data, email data, and sensor data.

In another example embodiment, the controller is configured to estimate a time to transmit data buffered by the STAs for each type of traffic.

In another example embodiment, the controller is configured to schedule when a STA in the set of STAs transmits data buffered in the STA to the AP device based on the type of traffic from the STA.

In another example embodiment, the controller is configured to command the first STA to transmit the data buffered in the first STA to the AP device, in response to a trigger signal received from the first STA.

In another example embodiment, the trigger signal is at least one of: a button press on a gaming controller a STA status report to the AP, or any periodic or random signal from the STAs indicating some uplink data to transmit.

In another example embodiment, the controller is configured to repeatedly transmit commands to the first STA to transmit the data buffered in the first STA to the AP device until the first STA actually transmits the data buffered in the first STA.

In another example embodiment, the controller is configured to command the second STA to transmit the data buffered in the second STA to the AP device within a time period from when the controller commanded the first STA to transmit the data buffered in the first STA; and the time period is less than an IEEE802.11ax standard contention period.

In another example embodiment, the controller is configured to transmit a set of data to the set of STAs during the time slot; the set of data includes data packets separately addressed to each of the set of STAs; the controller is configured to transmit the data packets in series and separated from each other by a time period; and the time period is less than an IEEE802.11ax standard contention period.

In another example embodiment, the controller is configured to transmit data to the first STA and command the first STA to transmit the data buffered in the first STA to the AP device before the controller is configured to transmit data to the second STA and command the second STA to transmit the data buffered in the second STA to the AP device.

In another example embodiment, the antenna is configured to transmit the request to transmit trigger frame to an additional set of STAs and exchange traffic with the additional set of STAs; and the controller configured to exchange traffic with the additional set of STAB outside of the slot time.

In another example embodiment, the AP device is a software defined access point (Soft-AP) embedded within a computer or microcontroller.

According to an example embodiment, a method of distributing instructions, stored on a non-transitory, tangible computer readable storage medium, for configuring a wireless Access Point (AP) device: wherein the instructions include, generating a reserve slot time trigger frame and a request to transmit trigger frame; transmitting the trigger frames over a physical media to a set of user station devices (STAs) and exchanging traffic with the set of STAs over the physical media; wherein the reserve slot time trigger frame is configured to reserve a slot time on the physical media; and commanding a first STA from the set of STAs to transmit data buffered in the first STA to the AP device using the request to transmit trigger frame.

In another example embodiment, the controller is configured to wait until the data buffered in the first STA is received by the AP device before commanding a second STA from the set of STAs to transmit data buffered in the second STA to the AP device.

In another example embodiment, the controller is configured to downlink data to and/or send request to transmit trigger frames to any STA in any order.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
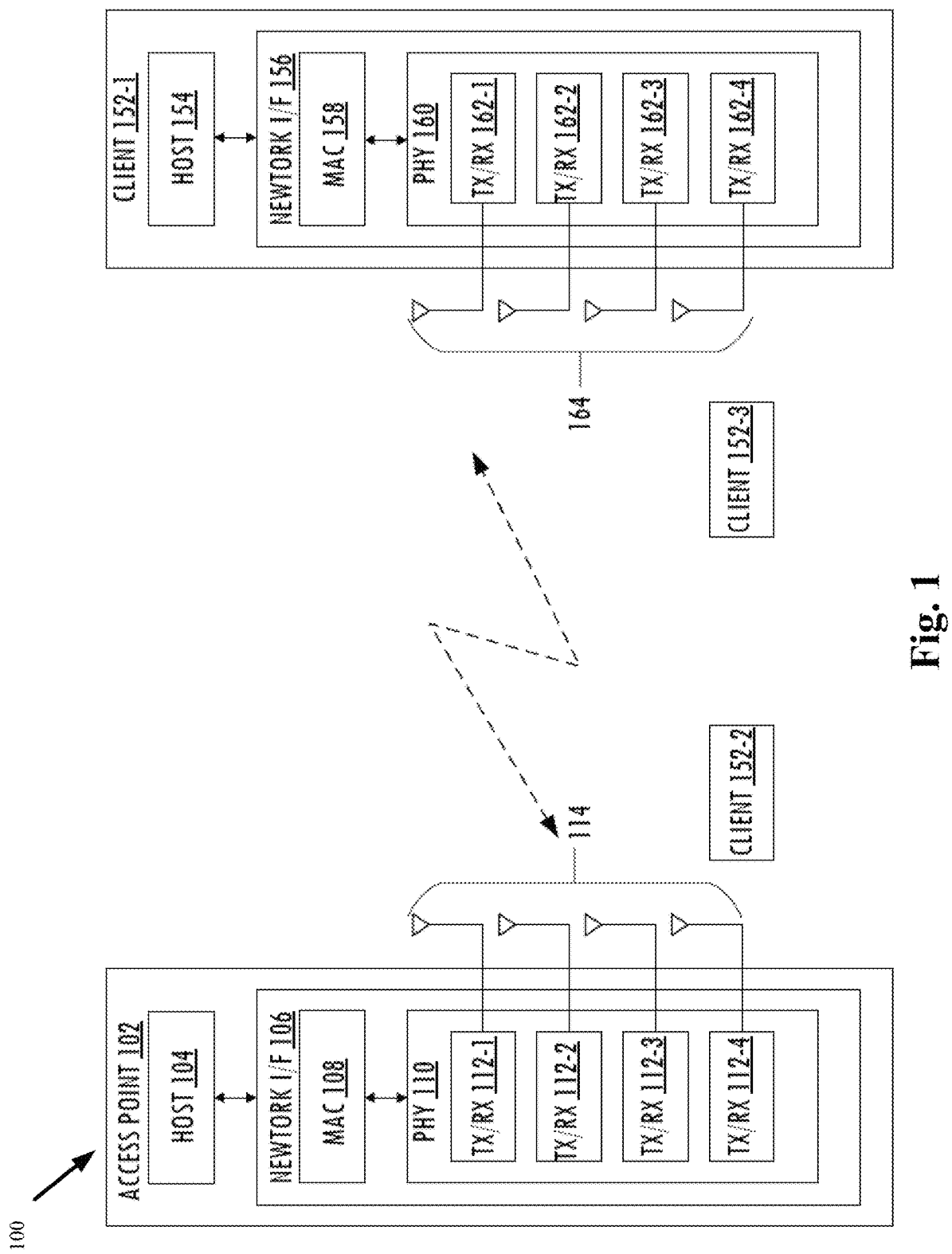
FIG. 1 represents an example wireless communications network (WLAN) formed by a set of wireless communications devices (i.e. APs and STAs).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth]. In various example embodiments, one or more APs may be affiliated into a logical AP group and/or one or more STAs may be affiliated into a logical STA group. SU and MU may refer to an AP, a STA, a set of APs and/or a set of STAs.

FIG. 1 represents an example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor/controller 108 and physical layer (PHY) processor/controller 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs.

MU Uplink (UL) and downlink (DL) OFDMA were first introduced in the IEEE802.11ax (i.e. 11ax) standard. In 11ax, an access point (AP) allocates different groups of OFDM tones (or resource units-RU) to different users/stations (STAs), so that data to or from multiple STAs may be delivered together in the same frame/packet.

MU-OFDMA does not increase the overall PHY-layer data rate, compared with conventional single user SU schemes; however, MU-OFDMA improves airtime efficiency—e.g. reduces the airtime due to individual STA channel contention, backoff, or the overhead caused by PHY preamble, or MAC frame exchanges. Any improvements in airtime efficiency translates to UL & DL latency reductions for between the various users (e.g AP and STAs).

Figures 2A, 2B, 2C:
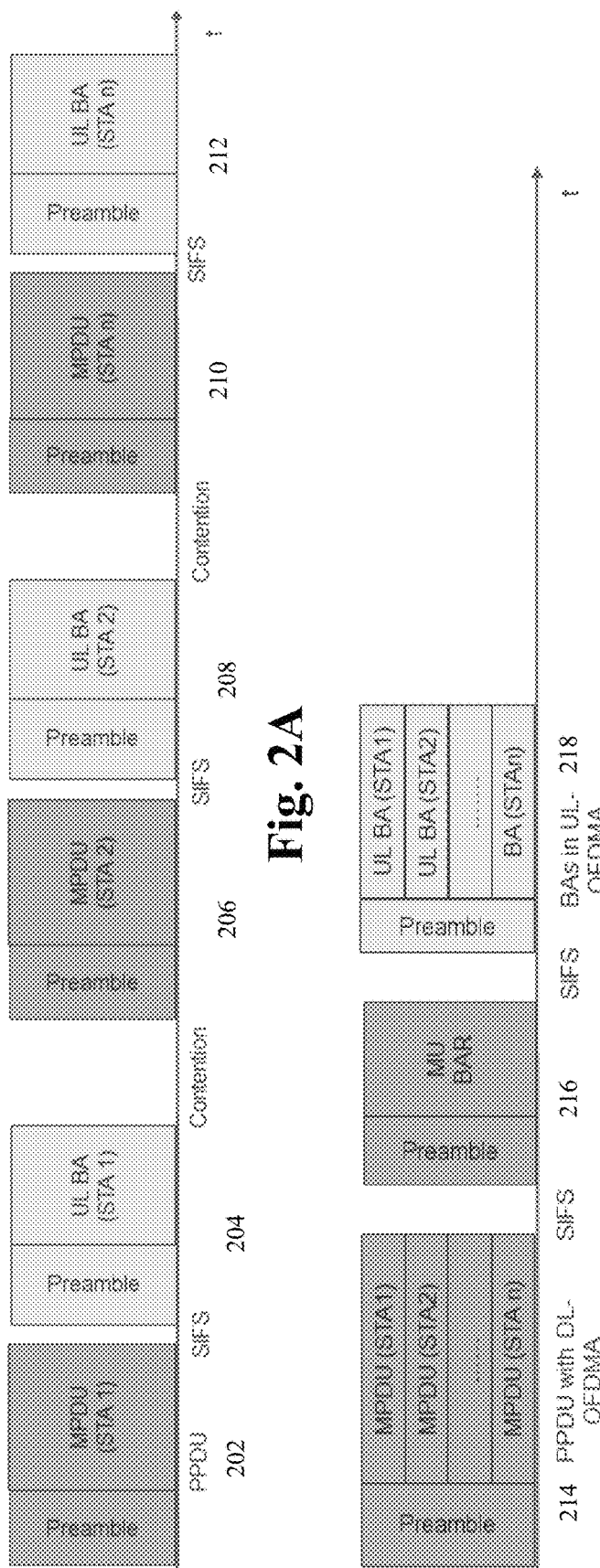
FIG. 2A represents an example timing diagram of a SU-OFDMA (DL or UL) airtime requirement.
FIG. 2B represents an example timing diagram of a DL MU-OFDMA airtime requirement.
FIG. 2C represents an example timing diagram of an UL MU-OFDMA airtime requirement.

FIG. 2A represents an example timing diagram of a SU (DL or UL) airtime requirement. Shown is an AP to STA1 DL data block frame 202, a SIFS (short inter-frame space) time, a STA1 to AP UL data BA (block acknowledgement) frame 204, a contention time, an AP to STA2 DL data block frame 206, another SIFS time, a STA2 to AP UL data BA (block acknowledgement) frame 208, another contention time, an AP to STAn DL data block frame 210, an additional SIFS time, and a STAn to AP UL data BA (block acknowledgement) frame 212.

During the 11 ax contention time any collision or yield to other STA's transmissions introduces longer latency for various other UL or DL transmissions from other STAs.

Thus channel contentions either inside a BSS or across overlapping BSSs (OBSS), different STAs and APs needing to transmit SU packets, will also have their own random backoff time in case two transmissions collide, resulting in significant increases in transmission latency.

FIG. 2B represents an example timing diagram of a DL MU-OFDMA airtime requirement. Shown is an AP to STA1, STA2 . . . STAn UL multi-user data block frame 214, an SIFS time, an AP to STA1, STA2 . . . STAn UL multi-user BAR (block acknowledgement request) frame 216, another SIFS time, and a STA1, STA2 . . . STAn to AP BA (block acknowledgement) frame 218. Clearly such 11ax MU DL has a shorter airtime and reduced latency as compared to the SU-OFDMA in FIG. 2A.

FIG. 2C represents an example timing diagram of an UL MU-OFDMA airtime requirement. Shown is a STA1, STA2 . . . STAn to AP data UL trigger frame 220, an SIFS time, an AP to STA1, STA2 . . . STAn UL multi-user data trigger frame 222, another SIFS time, and a STA1, STA2 . . . STAn to AP MBA (multi-user BAR (block acknowledgement request) frame 224. Again such 11ax MU UL has a shorter airtime and reduced latency as compared to the SU-OFDMA in FIG. 2A.

The AP to STA1, STA2 . . . STAn UL multi-user data block frame 222 of FIG. 2C will trigger all STAs to UL their data traffic since this trigger frame 222 includes ALL of the STAs unique identifiers (e.g. STA-ids).

Now discussed are example embodiments of a partial IEEE802.11ax MU-OFDMA message exchange that has a shorter airtime and reduced latency in a way similar to what fully compliant (i.e. true) IEEE802.11ax MU-OFDMA can achieve. This partial 11ax messaging is particularly applicable to cost constrained devices that use Soft-APs (aka. mobile APs, micro-APs, virtual router, etc.) attempting to enable MU-OFDMA. A SoftAP is a software defined access point that is typically generated in a generic device (e.g. computer, smartphone, etc.) that is not a dedicated AP device.

This partial IEEE802.11ax MU-OFDMA message exchange schedules when each STA uplinks its buffered data to the AP device. A modified multi-user trigger frame is used with only one station identifier (STA-id) to individually command a particular selected STA to uplink any buffered data to the AP device at a time of the AP device's choosing.

Figure 3:
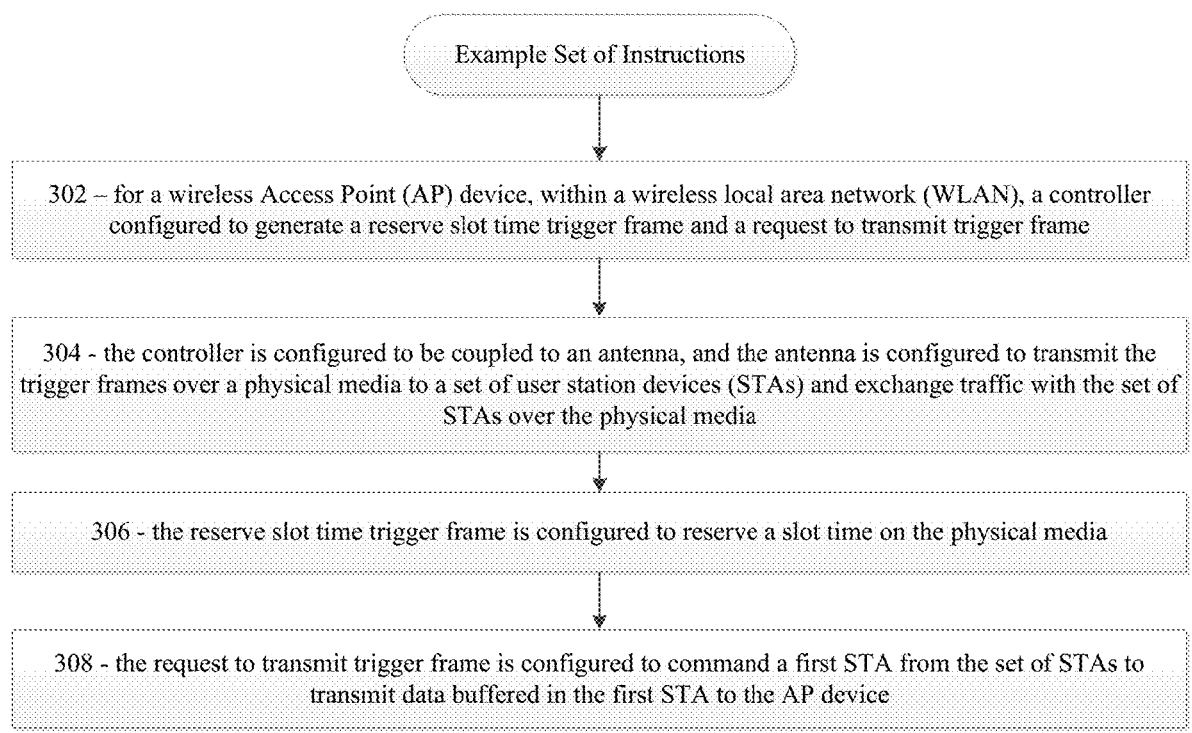
FIG. 3 represents an example set of overall instructions for enabling an AP device to perform partial IEEE802.11ax MU-OFDMA message exchanges.

FIG. 3 is an example set of overall instructions for enabling an AP device to perform partial IEEE802.11ax MU-OFDMA message exchanges. The order in which the instructions are discussed does not limit the order in which other example embodiments implement the instructions unless otherwise specifically stated. Additionally, in some embodiments the instructions are implemented concurrently.

A first example instruction set begins in 302—for a wireless Access Point (AP) device, within a wireless local area network (WLAN), a controller configured to generate a reserve slot time trigger frame and a request to transmit trigger frame. Next, in 304—the controller is configured to be coupled to an antenna, and the antenna is configured to transmit the trigger frames over a physical media to a set of user station devices (STAs) and exchange traffic with the set of STAs over the physical media. Then in 306—the reserve slot time trigger frame is configured to reserve a slot time on the physical media. Next, in 308—the request to transmit trigger frame is configured to command a first STA from the set of STAs to transmit data buffered in the first STA to the AP device.

In some example embodiments, the controller may also be configured to wait until the data buffered in the first STA is received by the AP device before commanding a second STA from the set of STAs to transmit data buffered in the second STA to the AP device.

In some example embodiments, the AP device is a software defined access point (Soft-AP) embedded within a computer or microcontroller. In many example embodiments, the AP device and set of STAs are included in a basic service set (BSS).

In some example embodiments, the AP device is configured to initiate an IEEE802.11ax UL-OFDMA from only one selected STA at a time that the AP device chooses. The AP device is able to trigger any associated 11ax STA's uplink transmission at any time selected by the AP device. Thus, the AP device has full control of both DL and UL traffic. In various example embodiments, the AP device is thus better able to schedule UL and DL traffic to avoid collisions, enhance airtime efficiency, reduce latency.

Controlling UL-OFDMA for each STA enables the Soft AP to fully control/schedule both DL and UL traffic, similar to full OFDMA support. This protocol is fully compliant with IEEE802.11ax standard, therefore interoperable with any standards compliant STA.

Additional example embodiments for implementing these instructions are now discussed in the context of the following Figures.

Figure 4:
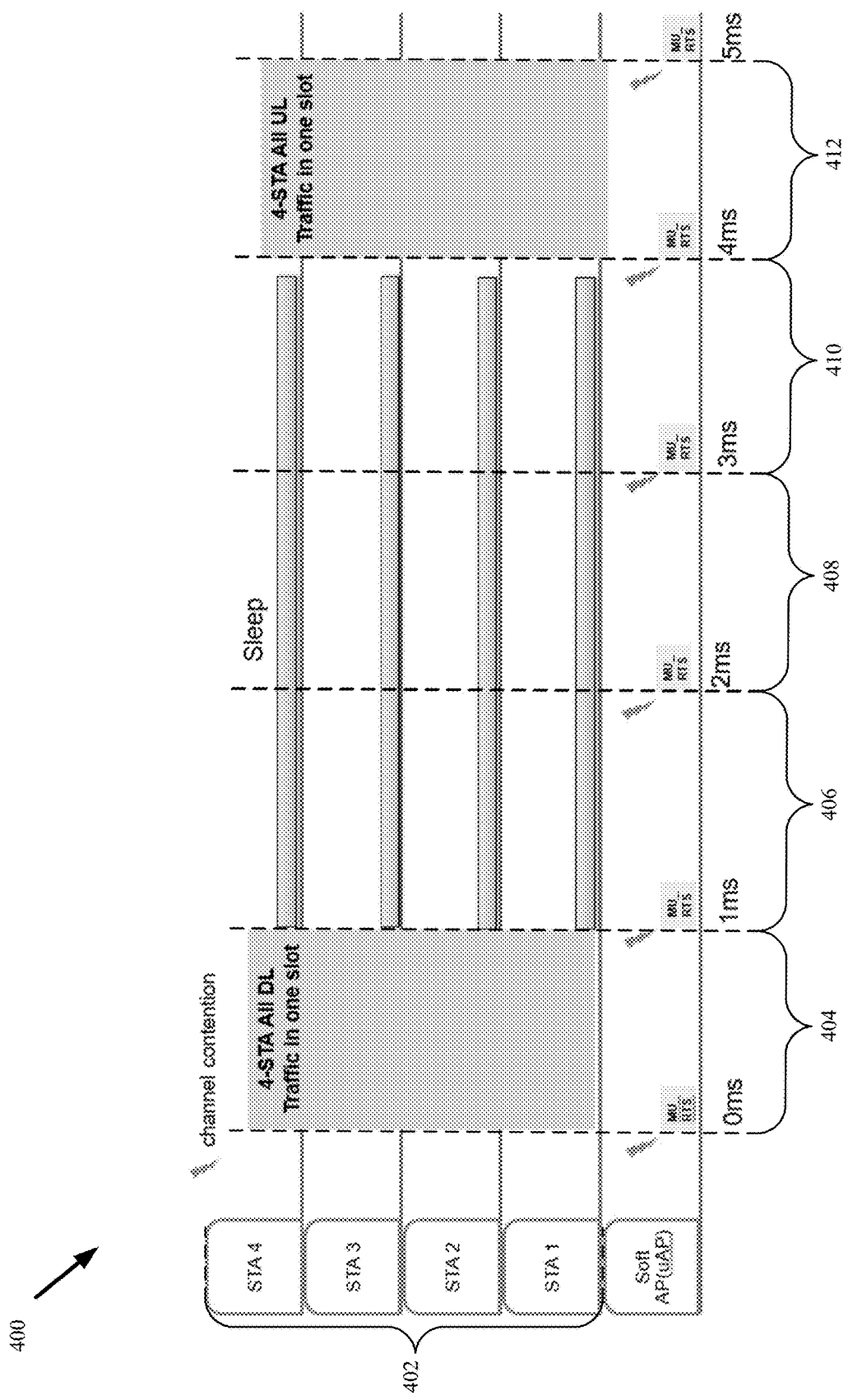
FIG. 4 represents an example timing diagram of a set of channel TXOP slots generated by the AP device using MU-RTS/CTS trigger frames for a selected set of 4 STAs.

FIG. 4 represents an example 400 timing diagram of a set of channel TXOP slots 404-412 generated by the AP device using MU-RTS/CTS trigger frames for a selected set of 4 STAs 402.

As introduced above, the AP device can generate a set of channel TXOP slots using MU-RTS/CTS trigger frames for a selected set of STAs. This can be effected by configuring the AP device to transmit 11ax MU-RTS trigger frames at a predefined rate to partition the physical media airtime into a set of "TXOP slots", for the selected set of STAs (e.g. STA1, STA2, STA3 and STA4).

The AP device in some example embodiments is a software defined access point (Soft-AP) embedded within a computer or microcontroller.

For example, the AP device can be configured to periodically send MU-RTS trigger frames every 1 ms, once the physical media becomes idle from a previous 11ax message exchange (i.e. send a first MU-RTS during the channel contention time). The MU-RTS trigger frame is a variation defined by 11ax, and carries/contains per-STA information for the selected set of STAs. Each selected STA will respond to the MU-RTS frame by sending a CTS frame with appropriate pre-synchronizations. The CTS frame is same as an UL-OFDMA STA CTS frame.

The MU-RTS trigger frame in some example embodiments is a single-user orthogonal frequency-division multiple access (SU-OFDMA) modulated trigger frame.

Since the MU-RTS/CTS frames are decodable by both 11ax and non-11ax APs and STAs whether in-BSS or OBSS (i.e. since they are similar to SU RTS/CTS frames), those in-BSS that were not selected and any other OBSS devices will not transmit within the TXOP slots created by the AP device in response to the MU-RTS trigger frames sent by the AP. As a result collisions will be avoided with these non-selected and other OBSS devices.

During each slot, the AP device in various example embodiments may: DL data to 11ax STAs; DL data to non-11ax STAs; 11ax STA sends UL data; non-11ax STA sends UL data; or no data to/from any STA. At the beginning of each slot, normal channel contention is still conducted, thereby giving a fair chance of channel access to OBSS STAs.

Figure 5:
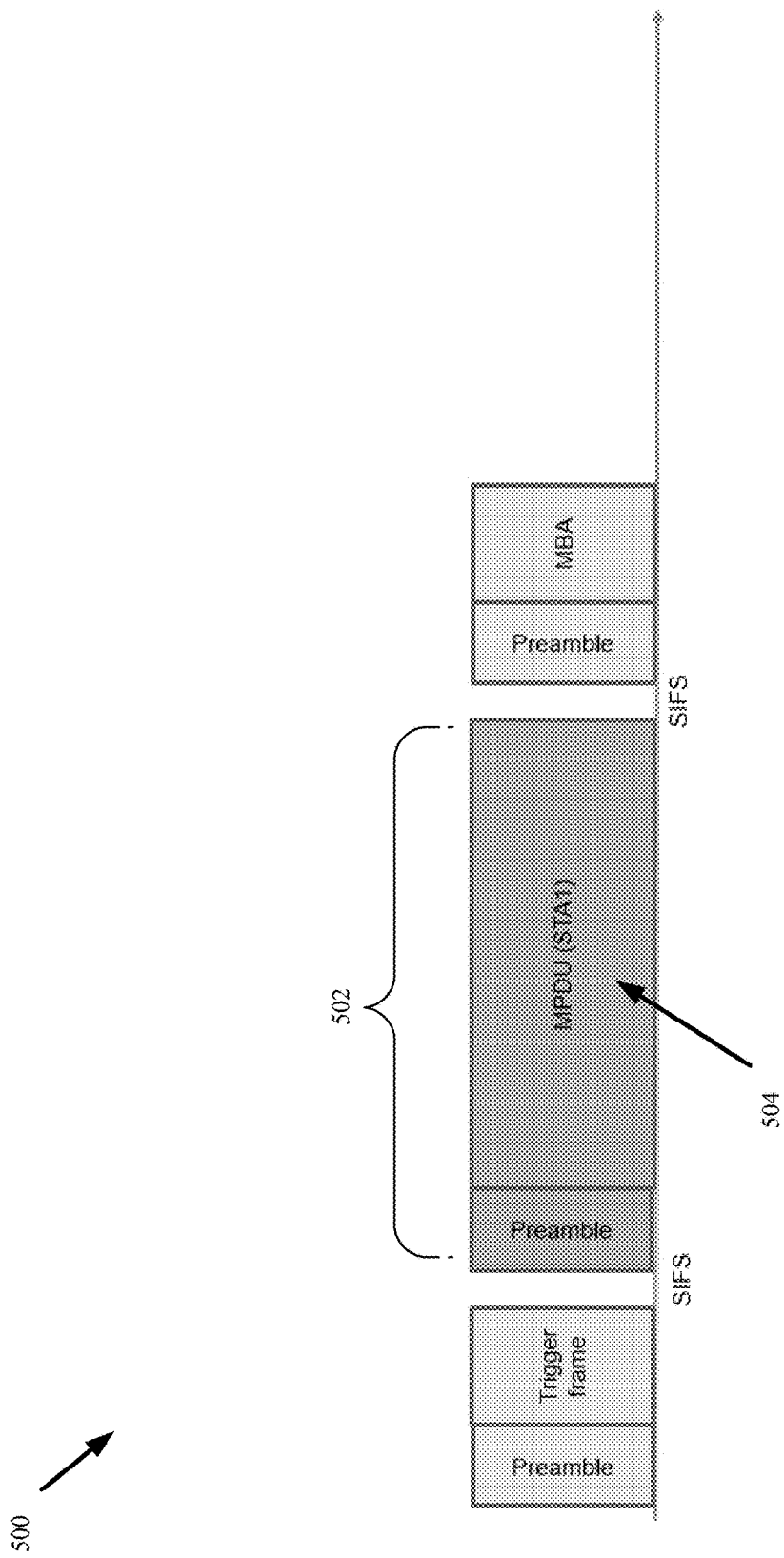
FIG. 5 represents an example MU-OFDMA trigger frame including only one STA identifier (STA-id).

FIG. 5 represents an example 500 MU-OFDMA trigger frame 502 including only one STA identifier (STA-id) 504.

Figure 6:
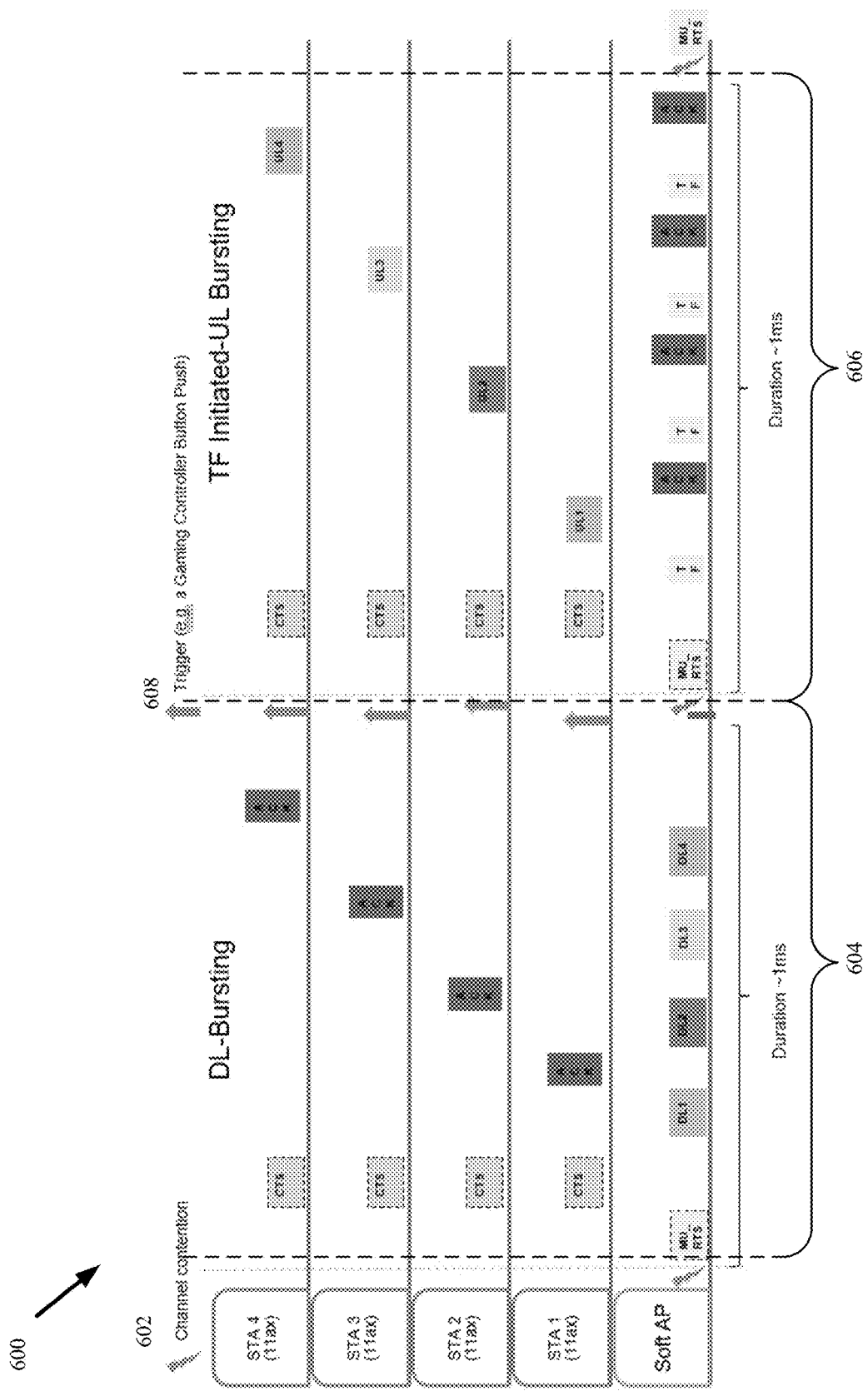
FIG. 6 represents an example timing diagram of the example AP device can transmitting a burst of DL traffic to the selected set of 4 STAs in a first TXOP slot, and receiving UL traffic sequentially from each of the selected set of 4 STAs in a second TXOP slot.

FIG. 6 represents an example 600 timing diagram of the example AP device can transmitting a burst of DL traffic to the selected set of 4 STAs 602 in a first TXOP slot 604, and receiving UL traffic sequentially from each of the selected set of 4 STAs 602 in a second TXOP slot 606. For example, DL1 is downlink data to STA1, and UL1 is uplink data from STA1. In this figure, in the middle of the DL burst, the gap between end of receiving the previous ACK and transmitting the next downlink data packet can be as short as SIFS.

Regarding the UL traffic from the set of STAs 602 in time slot 606, a controller within the AP device is configured to command STA1 to transmit data buffered in STA1 by sending a trigger frame (TF) addressed to only the STA1 (i.e. the TF includes a STA-id for STA1 only). The controller then commands the STA2 to transmit data buffered in STA2 by sending a trigger frame that includes only a STA-id for STA2, and so on for all the STAs 602.

In some example embodiments, the trigger frame (TF) includes station identification fields for all STAs 602 but only one of the station identification fields is populated with a STA-id of the targeted STA. In various example embodiments, the trigger frame (TF) is an IEEE802.11ax standard compliant UL trigger frame and the slot time corresponds to an IEEE802.11ax standard MU_RTS reserved slot time.

In this example embodiment, the controller commands all STAs 602 to transmit their buffered data during the slot time 606. The controller has complete control regarding an order in which each STA transmits its buffered data. For example, the controller can command all STAs in the set of STAs to sequentially transmit their buffered data in a first order during a first one of the multiple slot times and in a second order during a second one of the multiple slot times.

In various example embodiments, the reserve slot time trigger frame is a request to send trigger frame (MU_RTS). In response to the MU_RTS frame, the AP device is configured to receive a set of clear to send (CTS) frames from the set of STAs. In some example embodiments, the controller is configured to wait for the CTS frames before sending commands to transmit data buffered to the STAs. The reserve slot time trigger frame can be an IEEE802.11ax standard MU_RTS trigger frame.

In some example embodiments, the controller is configured to identify a type of traffic to be received from each STA in the set of STAs 602. The type of traffic may include: gaming data, video data, audio data, photo data, email data, and sensor data. Knowing the type of traffic, the controller can estimate a time to transmit data buffered by the STAs for each type of traffic, and schedule times for each of the STAs 602 to transmit their buffered data to the AP device based on the type of traffic from the STA.

In various example embodiments, the controller is configured to command the first STA to transmit the data buffered in the first STA to the AP device, in response to a trigger signal 608 received from any of the STAs 602. The trigger signal could be a button press on a gaming controller, a STA status report to the AP, or any periodic or random signal from the STAs indicating some uplink data to transmit.

In some example embodiments, the controller is configured to command the STAs 602 to sequentially transmit their buffered data within a time period from when the controller individually commanded the STAs to transmit their buffered data and the time period is less than an IEEE802.11ax standard contention period.

In this example embodiment, the controller has transmitted downlink (DL) data to all of the STAs 602 during the slot time 604. The downlink data includes data packets separately addressed to each of the set of STAs. Again a time period between each of the downlink data packets can be less than an IEEE802.11ax standard contention period.

SIFS times have been omitted from this Figure for clarity but for many example embodiments are still included in AP device to/from STA traffic exchanges.

Figure 7:
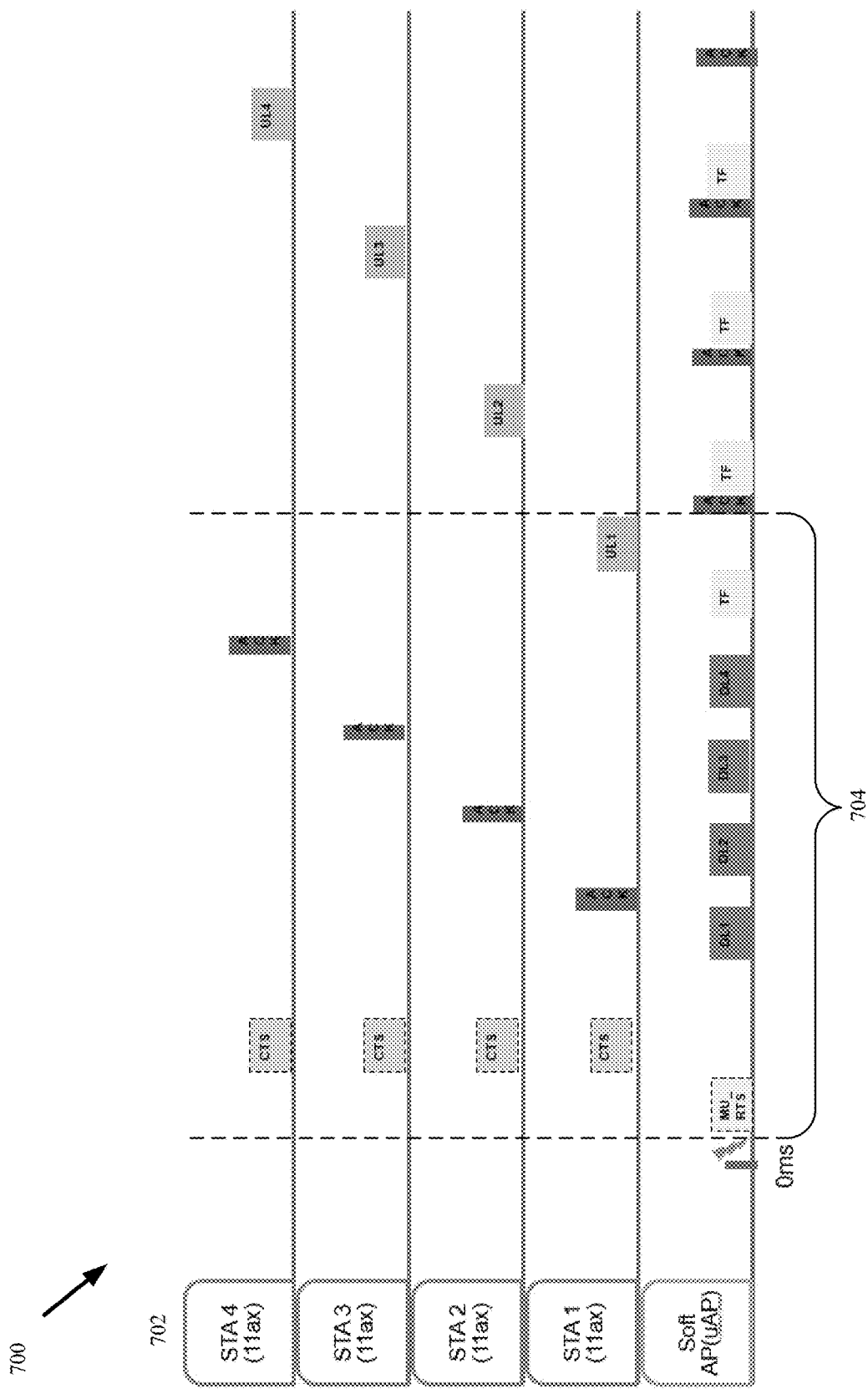
FIG. 7 represents an example timing diagram of how the example AP device can both transmit a burst of DL traffic to the selected set of 4 STAs and receive UL traffic sequentially from each of the selected set of 4 STAs in a time period that exceeds one TXOP slot.

FIG. 7 represents an example 700 timing diagram of how the example AP device can both transmit a burst of DL traffic to the selected set of 4 STAs 702 and receive UL traffic sequentially from each of the selected set of 4 STAs in a time period that exceeds one TXOP slot 704.

In this example embodiment, the STAs have not sent any trigger signals (i.e. no blue arrows are shown), however the AP device still individually commands the STAs to UL traffic to the AP device. This example could be one where because the AP device knows the "use" of the STAs, the AP device can predict that UL traffic will be available even though the STAs have not sent any trigger signals indicating as such.

Since AP device controls UL and DL timing the STAs won't need back-off time, thereby reducing latency. As mentioned earlier, the SIFS times have been omitted for clarity but still are included in the traffic exchange.

Figure 8:
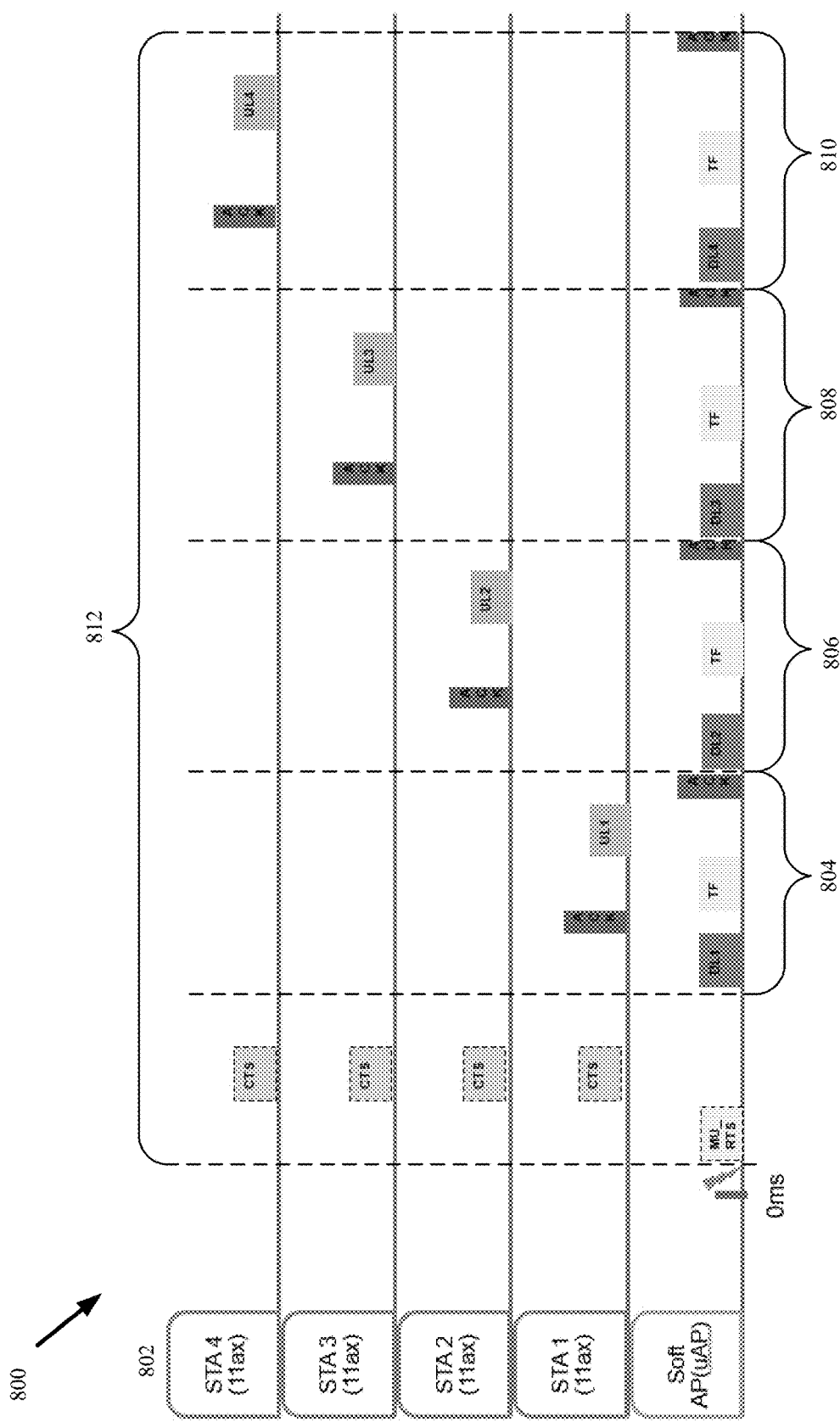
FIG. 8 represents an example timing diagram of how the example AP device can exchange both DL and UL traffic with one STA before exchanging both DL and UL traffic with another STA in one TXOP slot.

FIG. 8 represents an example 800 timing diagram of how the example AP device can exchange both DL and UL traffic with one STA (e.g. STA1) before exchanging both DL and UL traffic with another STA (e.g. STA2) in one TXOP slot.

In this example, STA1 DL and UL 804 shows the AP device first exchanging traffic with STA1; STA2 DL and UL 806 shows the AP device second exchanging traffic with STA2; STA3 DL and UL 808 shows the AP device third exchanging traffic with STA3; and STA4 DL and UL 810 shows the AP device finally exchanging traffic with STA4 all during one TXOP slot 812.

In other example embodiments, a total duration of the combined message exchanges may exceed a single slot time.

Figure 9:
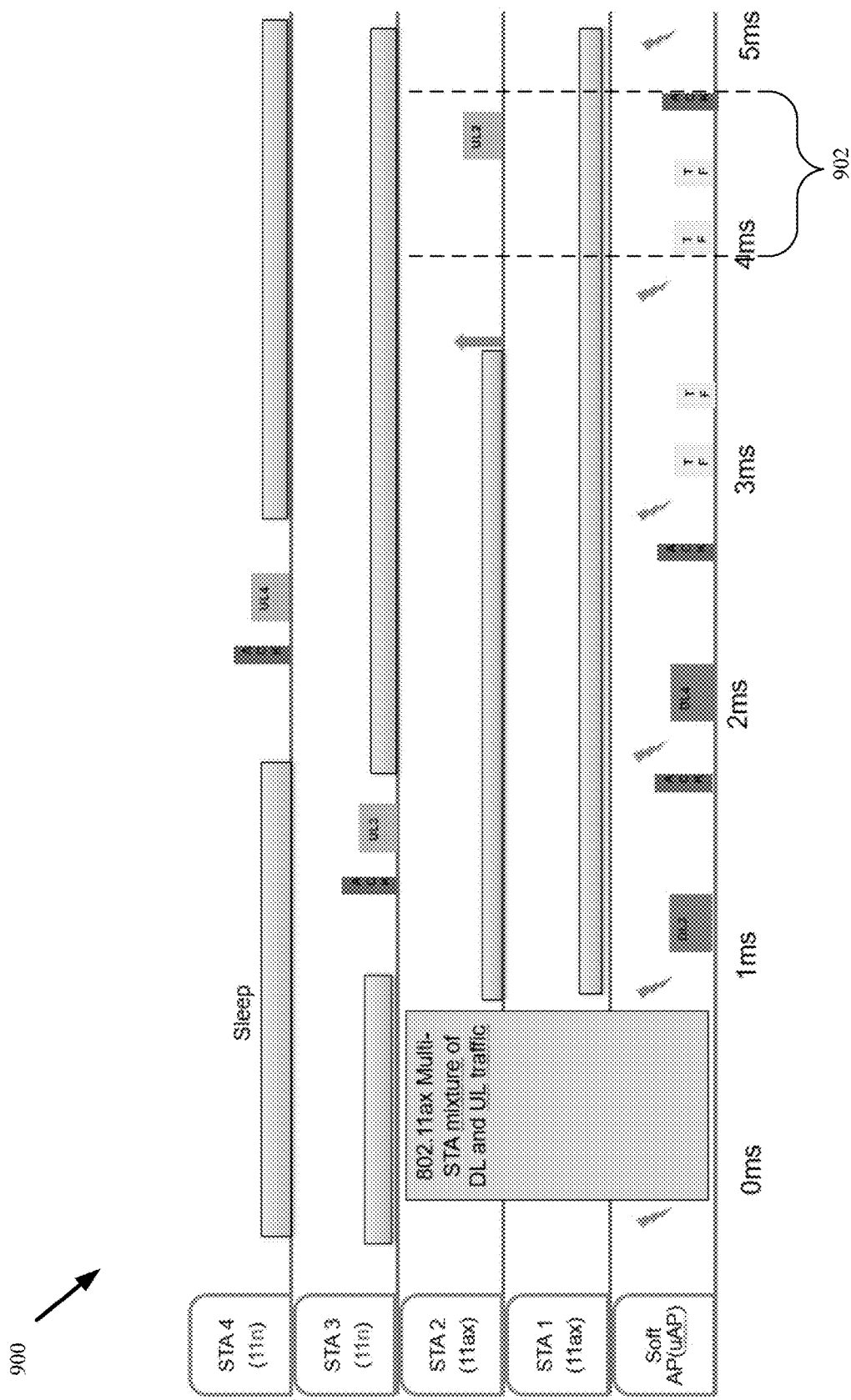
FIG. 9 represents an example timing diagram of how the example AP device can exchange traffic with both legacy STAs and MU-OFDMA STAs.

FIG. 9 represents an example 900 timing diagram of how the example AP device can exchange traffic with both legacy (i.e. non-802.11ax) STAs and MU-OFDMA (i.e. 802.11ax) STAs.

IEEE802.11ax traffic is being exchanged with STA1 and STA2. Legacy traffic is being exchanged with STA3 and STA4. Here the controller exchanges traffic with these additional legacy STAs outside of any MU_RTS created slot time. Additional STAs (legacy and/or 802.11ax) may be outside the basic service set (OBSS) and communicate with the AP device using normal backoff procedures.

Multiple single STA-id IEEE802.11.ax MU trigger frames (TFs) are also shown being sent to STA2 until UL2 data is sent from STA2.

Figure 10:
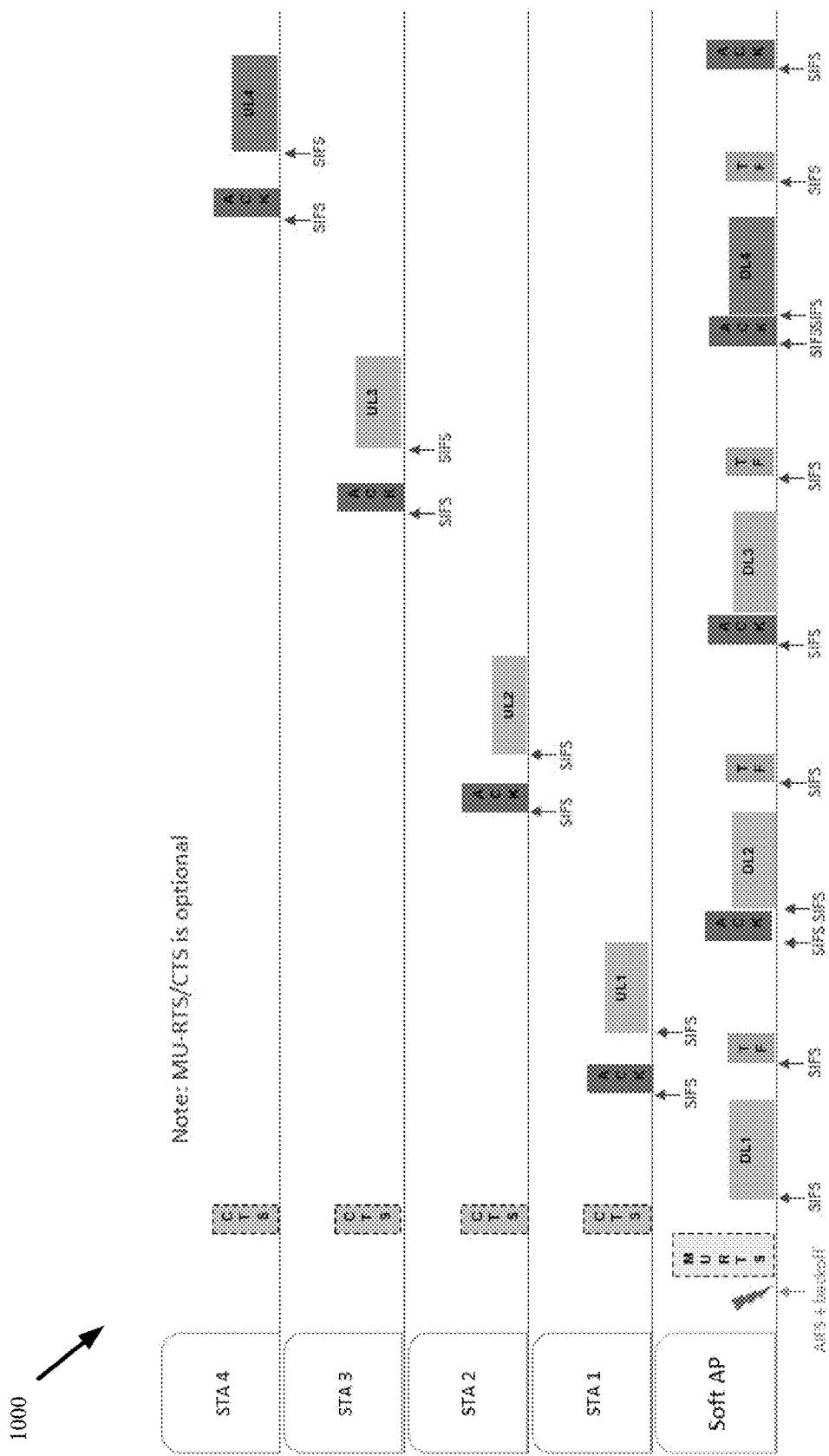
FIG. 10 represents an additional example timing diagram of how the example AP device can arbitrarily exchange trigger frames and UL and DL traffic with a set of STAs using bi-directional arbitrary scheduling.

FIG. 10 represents an additional example 1000 timing diagram of how the example AP device can arbitrarily exchange trigger frames and UL and DL traffic with a set of STAs using bi-directional arbitrary scheduling.

Figure 11:
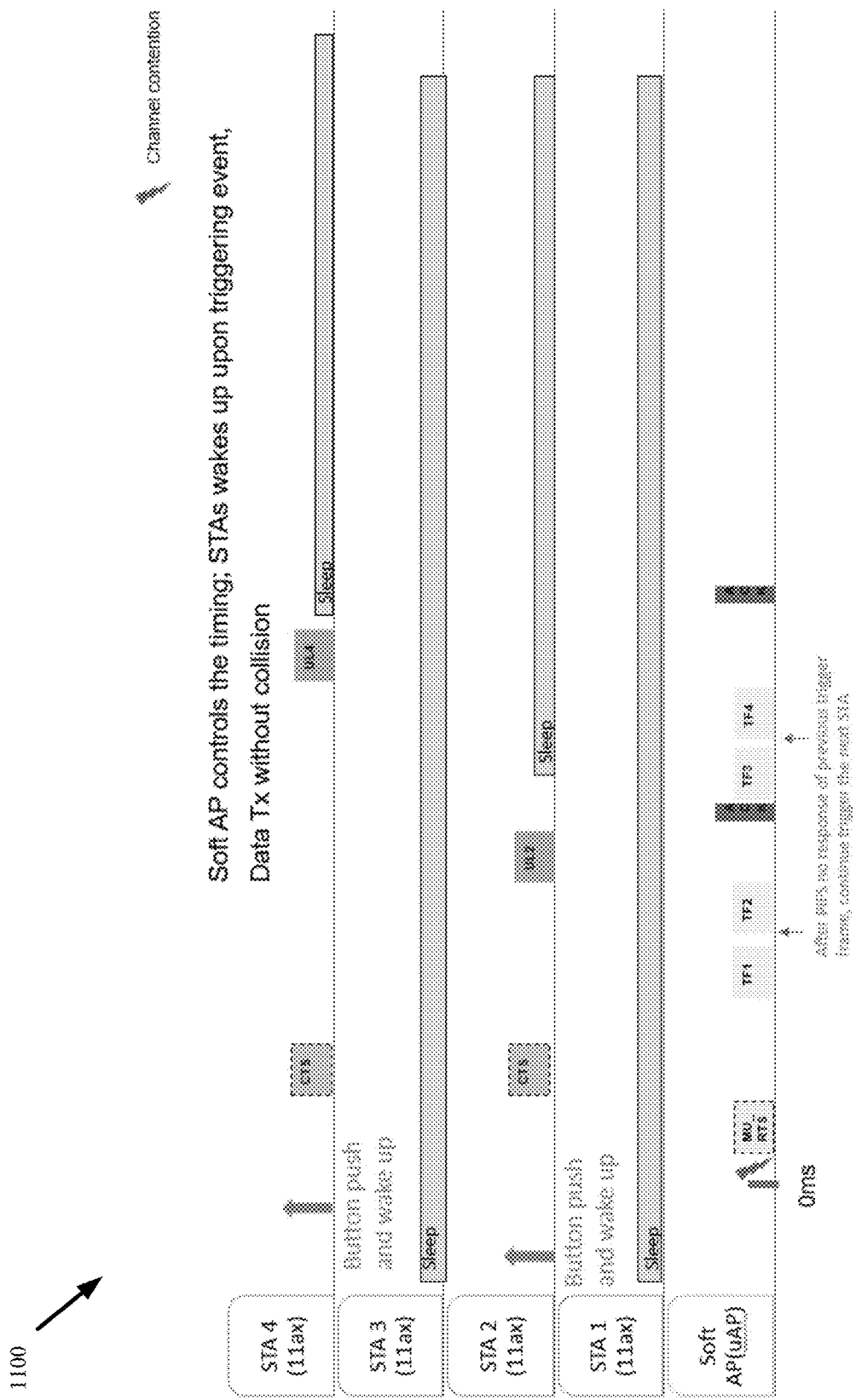
FIG. 11 represents an additional example timing diagram of how the example AP device can arbitrarily exchange trigger frames and UL and DL traffic with a set of STAs using opportunistic UL data, contention free scheduling.

FIG. 11 represents an additional example 1100 timing diagram of how the example AP device can arbitrarily exchange trigger frames and UL and DL traffic with a set of STAs using opportunistic UL data, contention free scheduling.

Figure 12:
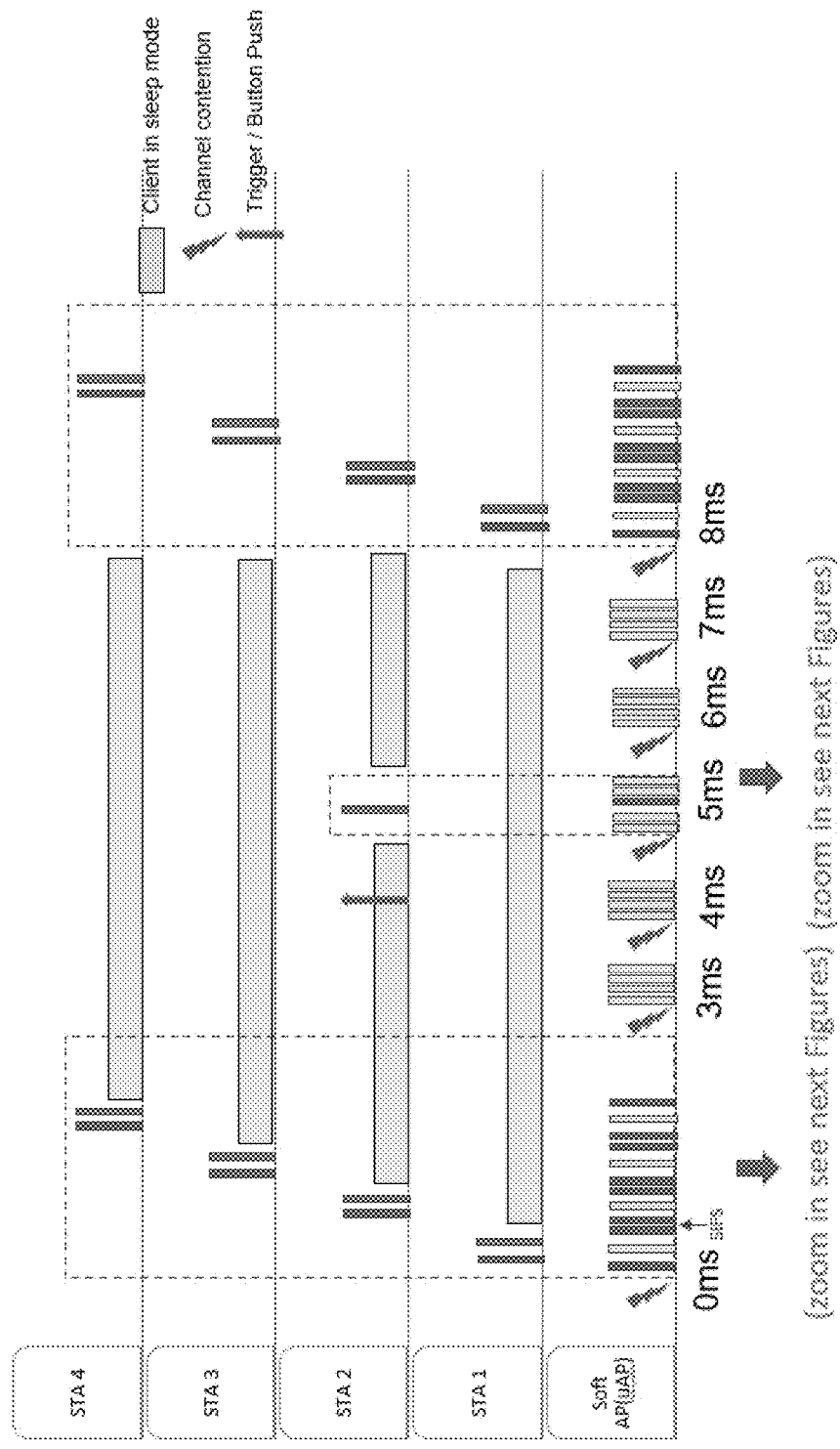
FIG. 12 represents an additional example timing diagram of how the example AP device can arbitrarily exchange trigger frames and UL and DL traffic with a set of STAs over multiple TxOP Slots where every 8 ms there are planned UL/DL traffic for each STA and for the rest slots opportunistic UL traffic.

FIG. 12 represents an additional example 1200 timing diagram of how the example AP device can arbitrarily exchange trigger frames and UL and DL traffic with a set of STAs over multiple TxOP Slots where every 8 ms there are planned UL/DL traffic for each STA and for the rest slots opportunistic UL traffic.

Figure 13:
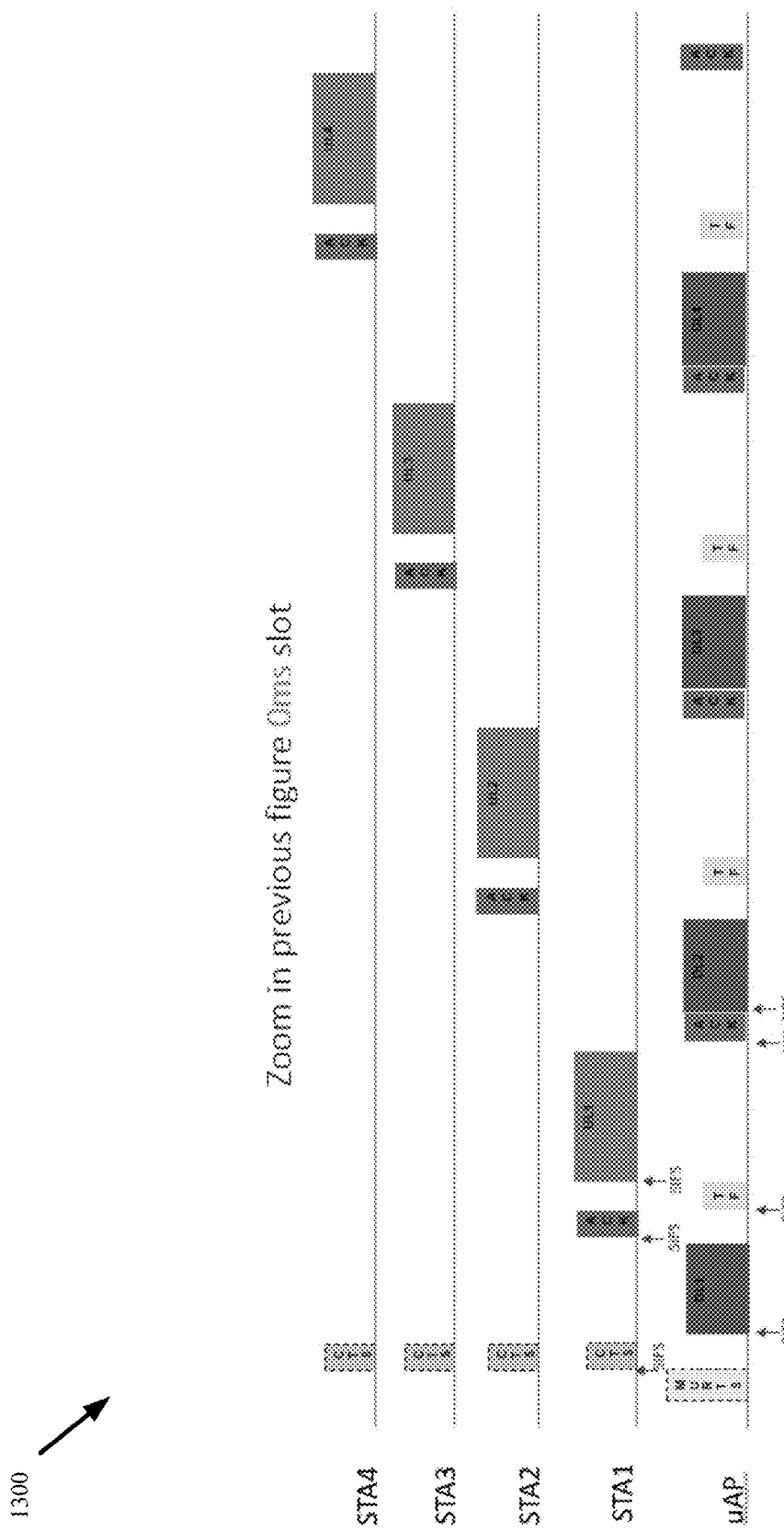
FIG. 13 represents a zoom in of FIG. 12's 0 ms slot.
Figure 14:
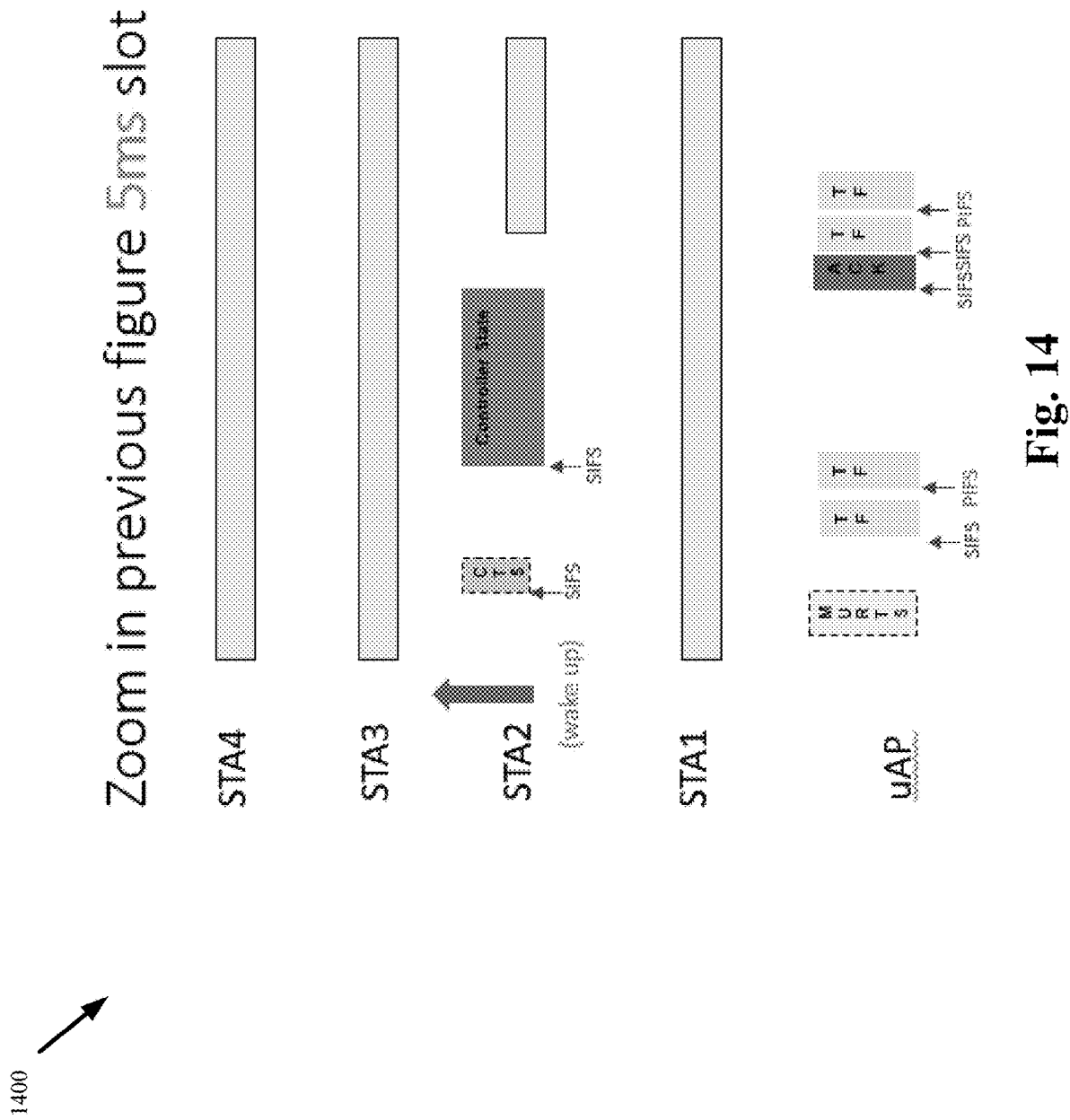
FIG. 14 represents a zoom in of FIG. 12's 5 ms slot.

FIG. 13 represents a zoom in 1300 of FIG. 12's 0 ms slot.
FIG. 14 represents a zoom in 1400 of FIG. 12's 5 ms slot.

Applications and use cases for the partial IEEE802.11ax MU-OFDMA message exchanges just discussed include example embodiments where the STAs are various game controllers that benefit from extremely short latencies, particularly within a single BSS. Use cases that require low latency, e.g. for gaming consoles communicating with gaming controllers (Joysticks, speakers, etc) are also contemplated. These message exchanges are suitable for applications requiring low latency but in a completely standard compliant way.

Regarding the instructions discussed earlier in this specification, various other devices, in addition to the AP device just discussed, can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless Access Point (AP) device, configured to operate within a wireless local area network (WLAN), comprising:
   a controller configured to generate a reserve slot time trigger frame and a request to transmit trigger frame;
   wherein the controller is configured to be coupled to an antenna;
   wherein the antenna is configured to transmit the trigger frames over a physical media to a set of user station devices (STAs) and exchange traffic with the set of STAs over the physical media;
   wherein the reserve slot time trigger frame is configured to reserve a slot time on the physical media; and
   wherein the request to transmit trigger frame is configured to command a first STA from the set of STAs to transmit data buffered in the first STA to the AP device during the slot time that was reserved by the reserve slot time trigger frame.

2. The device of claim 1:
   wherein the controller is configured to command the first STA to transmit the data buffered in the first STA during the slot time that was reserved by the reserve slot time trigger frame by sending a request to transmit trigger frame during the slot time that was reserved by the reserve slot time trigger frame addressed to only the first STA.

3. The device of claim 2:
   wherein the request to transmit trigger frame includes a station identifier (STA-id) for the first STA.

4. The device of claim 3:
   wherein the controller is configured to command the second STA to transmit the data buffered in the second STA during the slot time that was reserved by the reserve slot time trigger frame by sending a second request to transmit trigger frame during the slot time that was reserved by the reserve slot time trigger frame addressed to only the second STA by including a STA-id for the second STA.

5. The device of claim 2:
   wherein the request to transmit trigger frame includes station identification fields for all STAs in the set of STAs; and
   wherein only one of the station identification fields is populated with the STA-id for the first STA.

6. The device of claim 2:
   wherein the reserve slot time trigger frame is an IEEE802.11ax standard compliant uplink (UL) trigger frame.

7. The device of claim 1:
   wherein the controller is configured to command all STAs in the set of STAs to transmit their buffered data during the slot time.

8. The device of claim 1:
   wherein the slot time corresponds to an IEEE802.11ax standard MU_RTS trigger frame reserved slot time.

9. The device of claim 1:
   wherein the controller is configured to transmit multiple reserve slot time trigger frames configured to reserve multiple slot times; and
   wherein the controller is configured to command all STAs in the set of STAs to sequentially transmit their buffered data in a first order during a first one of the multiple slot times and in a second order during a second one of the multiple slot times.

10. The device of claim 1:
    wherein the reserve slot time trigger frame is a request to send trigger frame (MU_RTS).

11. The device of claim 1:
    wherein the data buffered is uplink (UL) data from the STAs.

12. The device of claim 1:
    wherein the controller is configured to identify a type of traffic to be received from each STA in the set of STAs.

13. The device of claim 12:
    wherein the type of traffic is at least one of: gaming data, video data, audio data, photo data, email data, and sensor data.

14. The device of claim 12:
    wherein the controller is configured to estimate a time to transmit data buffered by the STAs for each type of traffic.

15. The device of claim 12:
    wherein the controller is configured to schedule when a STA in the set of STAs transmits data buffered in the STA to the AP device based on the type of traffic from the STA.

16. The device of claim 1:
    wherein the controller is configured to command the first STA to transmit the data buffered in the first STA to the AP device, in response to a trigger signal received from the first STA.

17. The device of claim 16:
    wherein the trigger signal is at least one of: a button press on a gaming controller a STA status report to the AP, or any periodic or random signal from the STAs indicating some uplink data to transmit.

18. The device of claim 1:
    wherein the controller is configured to repeatedly transmit commands to the first STA to transmit the data buffered in the first STA to the AP device until the first STA actually transmits the data buffered in the first STA.

19. The device of claim 1:
    wherein the controller is configured to command the second STA to transmit the data buffered in the second STA to the AP device within a time period from when the controller commanded the first STA to transmit the data buffered in the first STA; and
    wherein the time period is less than an IEEE802.11ax standard contention period.

20. The device of claim 1:
    wherein the controller is configured to transmit a set of data to the set of STAs during the time slot;
    wherein the set of data includes data packets separately addressed to each of the set of STAs;
    wherein the controller is configured to transmit the data packets in series and separated from each other by a time period; and
    wherein the time period is less than an IEEE802.11ax standard contention period.

21. The device of claim 1:
    wherein the controller is configured to transmit data to the first STA and command the first STA to transmit the data buffered in the first STA to the AP device before the controller is configured to transmit data to the second STA and command the second STA to transmit the data buffered in the second STA to the AP device.

22. The device of claim 1:
wherein the antenna is configured to transmit the request to transmit trigger frame to an additional set of STAs and exchange traffic with the additional set of STAs; and
wherein the controller configured to exchange traffic with the additional set of STAs outside of the slot time.

23. The device of claim 1:
wherein the AP device is a software defined access point (Soft-AP) embedded within a computer or microcontroller.

24. The device of claim 1:
wherein the controller is configured to wait until the data buffered in the first STA is received by the AP device before commanding a second STA from the set of STAs to transmit data buffered in the second STA to the AP device.

25. The device of claim 1:
wherein the controller is configured to downlink data to and/or send request to transmit trigger frames to any STA in any order.

26. A wireless Access Point (AP) device, configured to operate within a wireless local area network (WLAN), comprising:
a controller configured to generate a reserve slot time trigger frame and a request to transmit trigger frame;
wherein the controller is configured to be coupled to an antenna;
wherein the antenna is configured to transmit the trigger frames over a physical media to a set of user station devices (STAs) and exchange traffic with the set of STAs over the physical media;
wherein the reserve slot time trigger frame is configured to reserve a slot time on the physical media;
wherein the request to transmit trigger frame is configured to command a first STA from the set of STAs to transmit data buffered in the first STA to the AP device;
wherein the controller is configured to command the second STA to transmit the data buffered in the second STA to the AP device within a time period from when the controller commanded the first STA to transmit the data buffered in the first STA; and
wherein the time period is less than a contention period.

27. A wireless Access Point (AP) device, configured to operate within a wireless local area network (WLAN), comprising:
a controller configured to generate a reserve slot time trigger frame and a request to transmit trigger frame;
wherein the controller is configured to be coupled to an antenna;
wherein the antenna is configured to transmit the trigger frames over a physical media to a set of user station devices (STAs) and exchange traffic with the set of STAs over the physical media;
wherein the reserve slot time trigger frame is configured to reserve a slot time on the physical media;
wherein the request to transmit trigger frame is configured to command a first STA from the set of STAs to transmit data buffered in the first STA to the AP device;
wherein the controller is configured to transmit a set of data to the set of STAs during the time slot;
wherein the set of data includes data packets separately addressed to each of the set of STAs;
wherein the controller is configured to transmit the data packets in series and separated from each other by a time period; and
wherein the time period is less than a contention period.

* * * * *